United States Patent
Golriz et al.

(12) 
(10) Patent No.: US 12,319,162 B2
(45) Date of Patent: Jun. 3, 2025

(54) PRE-CHARGING USING AN ON-BOARD CHARGER AND ELECTRIC-VEHICLE HIGH-VOLTAGE ARCHITECTURE

(71) Applicant: Volvo Car Corporation, Gothenburg (SE)

(72) Inventors: Arsam Golriz, Gothenburg (SE); Narendar Rao Gannamaneni, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 576 days.

(21) Appl. No.: 17/651,176

(22) Filed: Feb. 15, 2022

(65) Prior Publication Data
US 2022/0281335 A1 Sep. 8, 2022

Related U.S. Application Data
(60) Provisional application No. 63/157,355, filed on Mar. 5, 2021.

(51) Int. Cl.
*H02J 7/00* (2006.01)
*B60L 53/24* (2019.01)

(52) U.S. Cl.
CPC .......... *B60L 53/24* (2019.02); *B60L 2210/10* (2013.01)

(58) Field of Classification Search
USPC ....................................................... 320/104
See application file for complete search history.

(56) References Cited

U.S. PATENT DOCUMENTS

| | | |
|---|---|---|
| 10,773,601 B2 | 9/2020 | Curuvija et al. |
| 10,778,026 B2 * | 9/2020 | Langlinais ................ H02J 7/00 |
| 2015/0097526 A1 * | 4/2015 | DeDona ................. B60L 53/16 |
| | | 320/109 |
| 2019/0359078 A1 | 11/2019 | Yamada et al. |
| 2021/0008996 A1 * | 1/2021 | Dow ....................... B60L 53/62 |

(Continued)

FOREIGN PATENT DOCUMENTS

| CN | 105048601 A | * 11/2015 |
|---|---|---|
| EP | 3 226 395 A1 | 10/2017 |

OTHER PUBLICATIONS

Machine translation of CN105048601 (Year: 2015).*

(Continued)

*Primary Examiner* — Samuel Berhanu
(74) *Attorney, Agent, or Firm* — Amin, Turocy & Watson, LLP

(57) ABSTRACT

An electric vehicle pre-charging circuit is provided. In one or more embodiments, the electric vehicle pre-charging circuit can comprise a first contactor located on a positive bus between a load and a battery. In various embodiments, the electric vehicle pre-charging circuit can comprise a second contactor located on a negative bus between the load and the battery. In further embodiments, the electric vehicle pre-charging circuit can comprise an on-board charger connected to the positive bus and the negative bus on a battery-side of the positive bus and a battery-side of the negative bus, wherein a phase wire connects the on-board charger to the positive bus on a load-side of the positive bus, and wherein a neutral wire connects the on-board charger to the negative bus on a load-side of the negative bus.

20 Claims, 9 Drawing Sheets

(56) References Cited

U.S. PATENT DOCUMENTS

2021/0129778 A1* 5/2021 Fernández Bañares ............... B60N 2/01541

OTHER PUBLICATIONS

Communication pursuant to Article 94(3) EPC received for EP Patent Application Serial No. 22160026.5 dated Sep. 27, 2023, 6 pages.
Extended European Search Report received for E.P Patent Application Serial No. 22160026.5 dated Jun. 7, 2022, 8 pages.

* cited by examiner

PRE-CHARGING USING AN ON-BOARD CHARGER AND ELECTRIC-VEHICLE HIGH-VOLTAGE ARCHITECTURE

CROSS-REFERENCE TO RELATED APPLICATION

This application claims priority to U.S. Provisional Patent Application No. 63/157,355, filed on Mar. 5, 2021, and entitled "PRE-CHARGE OF THE HIGH-VOLTAGE DC CAPACITANCE USING AN ON-BOARD CHARGER AND ELECTRIC-VEHICLE HIGH-VOLTAGE ARCHITECTURE," the entirety of which application is hereby incorporated by reference herein.

TECHNICAL FIELD

The disclosed subject matter relates to electric vehicle pre-charging, and more particularly, to electric vehicle pre-charging using an on-board charger and electric-vehicle high-voltage architecture.

BACKGROUND

Electric vehicles (EV)s can utilize a pre-charge circuit to limit an inrush current, which can increase lifespans of EV components and improve EV reliability. However, conventional pre-charge circuits are bulky, possess low efficiencies, and are expensive to implement, thus raising a cost of a corresponding EV or other vehicle, such as a hybrid electric vehicle or plug-in hybrid electric vehicle. Further, conventional pre-charge circuits utilize mechanical relays and resistors, and conventional pre-charging typically occurs outside of a power conversion block.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. As described, there exists a need for smaller, more efficient, and less expensive pre-charging architectures, and various embodiments are described herein to this end and/or other ends.

According to an embodiment, an electric vehicle pre-charging circuit can comprise a first contactor located on a positive bus between a load and a battery; a second contactor located on a negative bus between the load and the battery; and an on-board charger connected to the positive bus and the negative bus on a battery-side of the positive bus and a battery-side of the negative bus, wherein a phase wire connects the on-board charger to the positive bus on a load-side of the positive bus, and wherein a neutral wire connects the on-board charger to the negative bus on a load-side of the negative bus.

According to another embodiment, an electric vehicle pre-charging circuit can comprise a first contactor located on a positive bus between a load and a battery; a second contactor located on a negative bus between the load and the battery; an on-board charger connected to the positive bus and the negative bus on a load-side of the positive bus and a load-side of the negative bus; and a metal-oxide-semiconductor field-effect transistor (MOSFET) switch connected to the positive bus on a battery-side of the first contactor and to the on-board charger.

According to an additional embodiment, a method can comprise generating, by a system comprising a processor and using a direct current to direct current converter, a pre-charge voltage and a pre-charge current; closing, by the system, a first pair of metal-oxide-semiconductor field-effect transistors of an on-board charger; opening, by the system, a second pair of metal-oxide-semiconductor field-effect transistors of the on-board charger; and in response to a pre-charging operation being determined to be completed, opening, by the system, the first pair of metal-oxide-semiconductor field-effect transistors.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Embodiments described herein more effectively pre-charge a high-voltage (HV) bus (e.g., HV DC bus 102). In this regard, embodiments herein can integrate a bidirectional on-board charger (OBC) and direct current to direct current (DC-DC) converter into a single module or unit, thus leveraging existing EV components. It is additionally noted that various embodiments herein can comply with one or more standard safety requirements.

Figure 1:
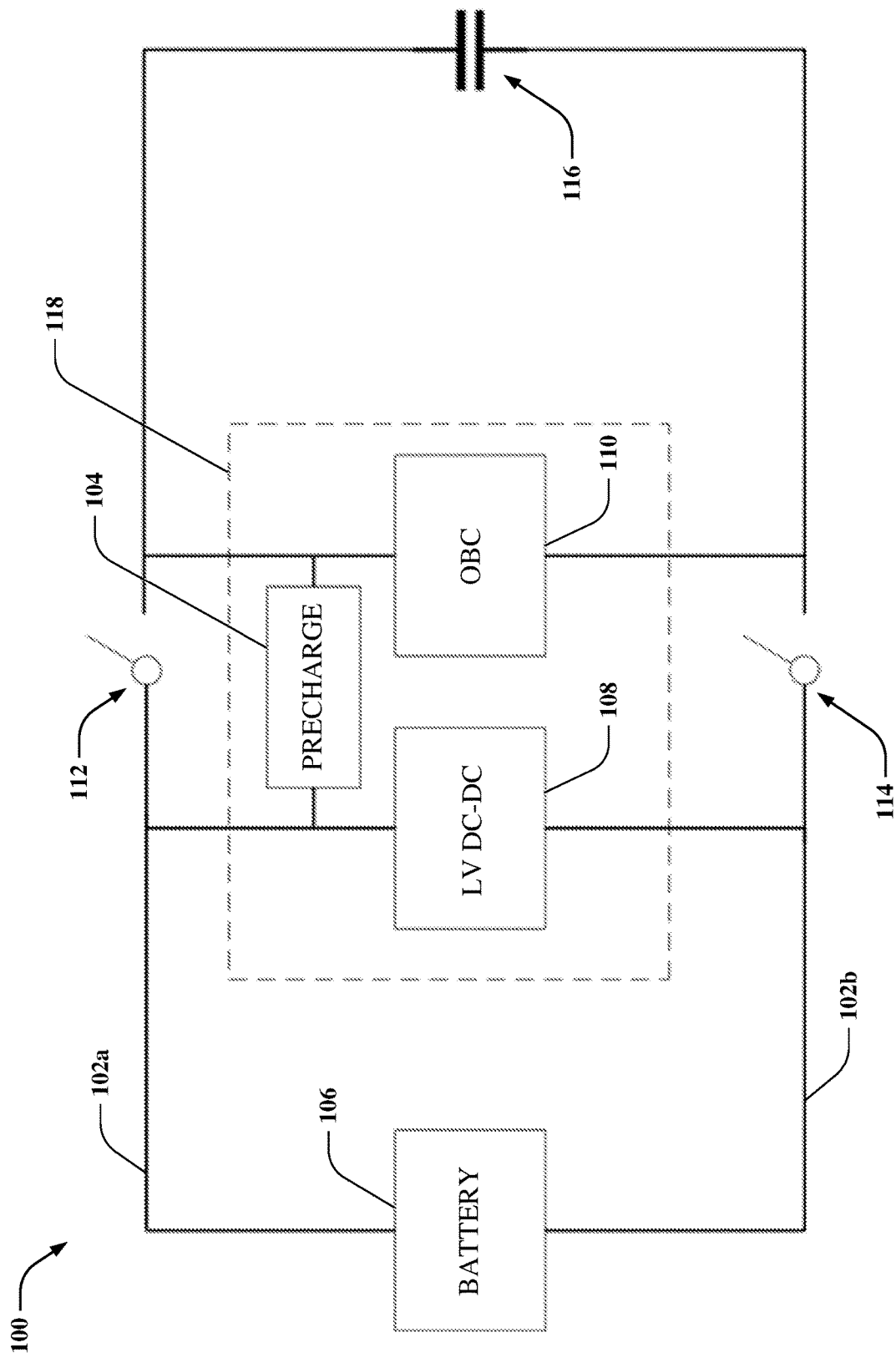
FIG. 1 illustrates a block diagram of an example, non-limiting pre-charging circuit in accordance with one or more embodiments described herein.

FIG. 1 illustrates a block diagram of an example, non-limiting pre-charging circuit 100 (e.g., a pre-charging architecture) in accordance with one or more embodiments described herein. In various embodiments, the pre-charging circuit 100 can comprise an HV DC bus 102 (e.g., positive bus 102a and negative bus 102b), battery 106 (e.g., an HV battery, such as an 800 volt battery, 600 volt battery, 400 volt battery, or another suitable battery), contactor 112 (e.g., a first contactor), contactor 114 (e.g., a second contactor), load 116, and/or pre-charge module 118. In one or more embodiments, the pre-charge module 118 can comprise a pre-charge circuit 104, low voltage (LV) DC-DC converter 108, and/or OBC 110.

According to an embodiment, LV DC-DC converter 108 can be connected to the HV DC bus 102 before (e.g., on a battery-side of) the main contactors (e.g., contactor 112 and contactor 114). In this regard, on-board charger (OBC) 110 can be connected to the HV DC bus 102 after (e.g., on a load-side of) the main contactors (e.g., contactor 112 and contactor 114). In other embodiments, the LV DC-DC converter 108 can be connected to the HV DC bus 102 after (e.g., on a load-side of) the main contactors (e.g., contactor 112 and contactor 114). In this regard, on-board charger (OBC) 110 can be connected to the HV DC bus 102 after (e.g., on a battery-side of) the main contactors (e.g., contactor 112 and contactor 114). Further in this regard, as compared with conventional pre-charge circuits, and embodiments herein can enable a pre-charge function to be conducted using an integrated module (e.g., pre-charge module 118). It is noted that such placement of the LV DC-DC converter 108 and/or OBC 110 can enable removal or omission of a LV battery (e.g., a 12 volt battery) from a corresponding vehicle. It is further noted that load 116 can comprise one or more of a variety of HV loads (e.g., connected in parallel) to a drive system (e.g., a traction inverter, electric motor, or other drive system or drive system component) of a corresponding EV or other suitable vehicle, such as a hybrid electric vehicle or plug-in hybrid electric vehicle. It is additionally noted that load 116 can comprise one or more of a variety of loads, capacitors, or other components of a corresponding EV. For example, load 116 can additionally or alternatively comprise a traction inverter, an OBC, and/or other suitable EV components. In this regard, while load 116 is depicted as a capacitor, this is solely representative and load 116 is not limited to a capacitor. It is noted that while FIG. 1 does not depict a controller, pre-charging circuit 100 and/or any other pre-charging circuit (e.g., pre-charging circuit 200, pre-charging circuit 300, pre-charging circuit 400, or pre-charging circuit 500), architecture, or embodiment herein can comprise a controller (e.g., a controller 202 or similar, as later discussed in greater detail).

Figure 2:
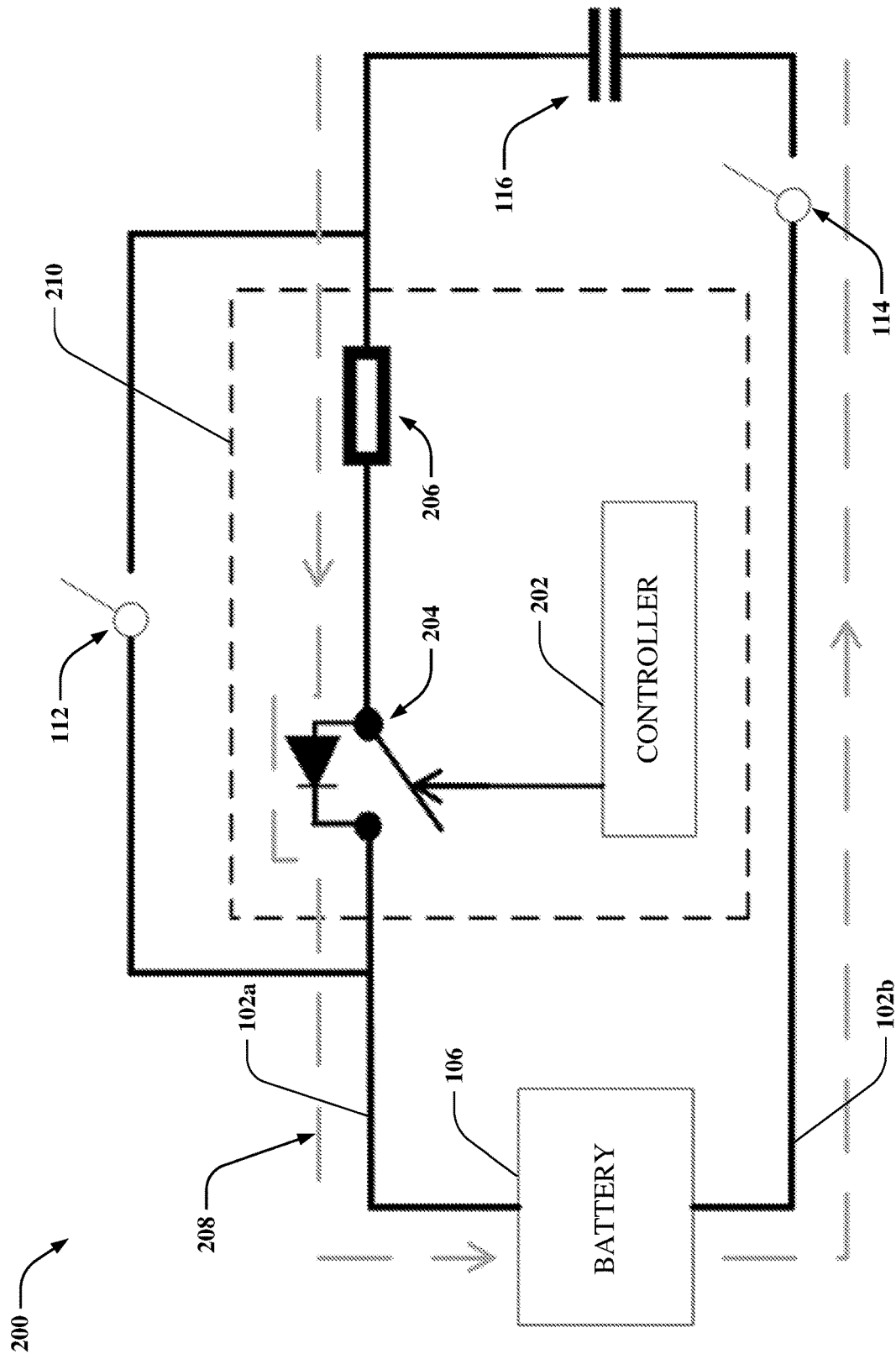
FIG. 2 illustrates a block diagram of an example, non-limiting pre-charging circuit in accordance with one or more embodiments described herein.

FIG. 2 illustrates a block diagram of an example, non-limiting pre-charging circuit 200 (e.g., a pre-charging architecture) in accordance with one or more embodiments described herein. In various embodiments, the pre-charging circuit 200 can comprise a battery 106, load 116, contactor 112, contactor 114, controller 202, switch 204, resistor 206, and/or pre-charge module 210. In one or more embodiments, pre-charge module 210 can comprise switch 204, resistor 206, and/or controller 202. In various embodiments, the pre-charge module 210 can be similar to the pre-charge module 118. It is noted that, in FIG. 2, LV DC-DC converter 108 and OBC 110 are omitted for purposes of illustration, though it is further noted that the pre-charge module 210 can comprise the LV DC-DC converter 108 and OBC 110. It is additionally noted the pre-charge circuit 104 can comprise one or more components of the pre-charge module 210.

According to an embodiment, the controller 202 can generate a signal, which can open or close switch 204. Is it noted that the controller 202 can comprise a processor, memory, one or more sensors (e.g., voltmeters, current sensors, switch position sensor, and/or other suitable sensors), and/or other suitable components, which can enable the controller 202 to open or close switches, contactors, relays, or otherwise control various components described herein. In various embodiments, switch 204 can comprise a metal-oxide-semiconductor field-effect transistor (MOSFET) or another suitable switch or contactor. In this regard, the controller 202 can cause switch 204 to open or close. Such MOSFETs occupy significantly less space and can be surface-mounted. Thus, by utilizing MOSFETs rather than a conventional pre-charge relay, space in a corresponding vehicle can be saved. However, it is noted that when utilizing MOSFETs, thermal dissipation and unintended current flow through respective body diode(s) can occur and should thus be managed. Therefore, active cooling (e.g., of a battery 106, LV DC-DC converter 108, or OBC 110) can be utilized for thermal management of MOSFETs herein and/or pre-charge module 118. Additionally, with use of MOSFETs, unintended current flow (e.g., reverse current potential) can occur through respective free body diode(s) of the MOSFETs (e.g., reverse direction of flow 208 in FIG. 2). In this regard, if there is a large enough voltage difference between the normal path that the current would flow (left to right in this case) when a main contactor (e.g., contactor 112 or contactor 114) opens. Further in this regard, when the voltage across load 116 is higher than that of the battery 106, the free body diode (e.g., of the switch 204) can allow unintended current flow despite the switch 204 being open.

Figure 3:
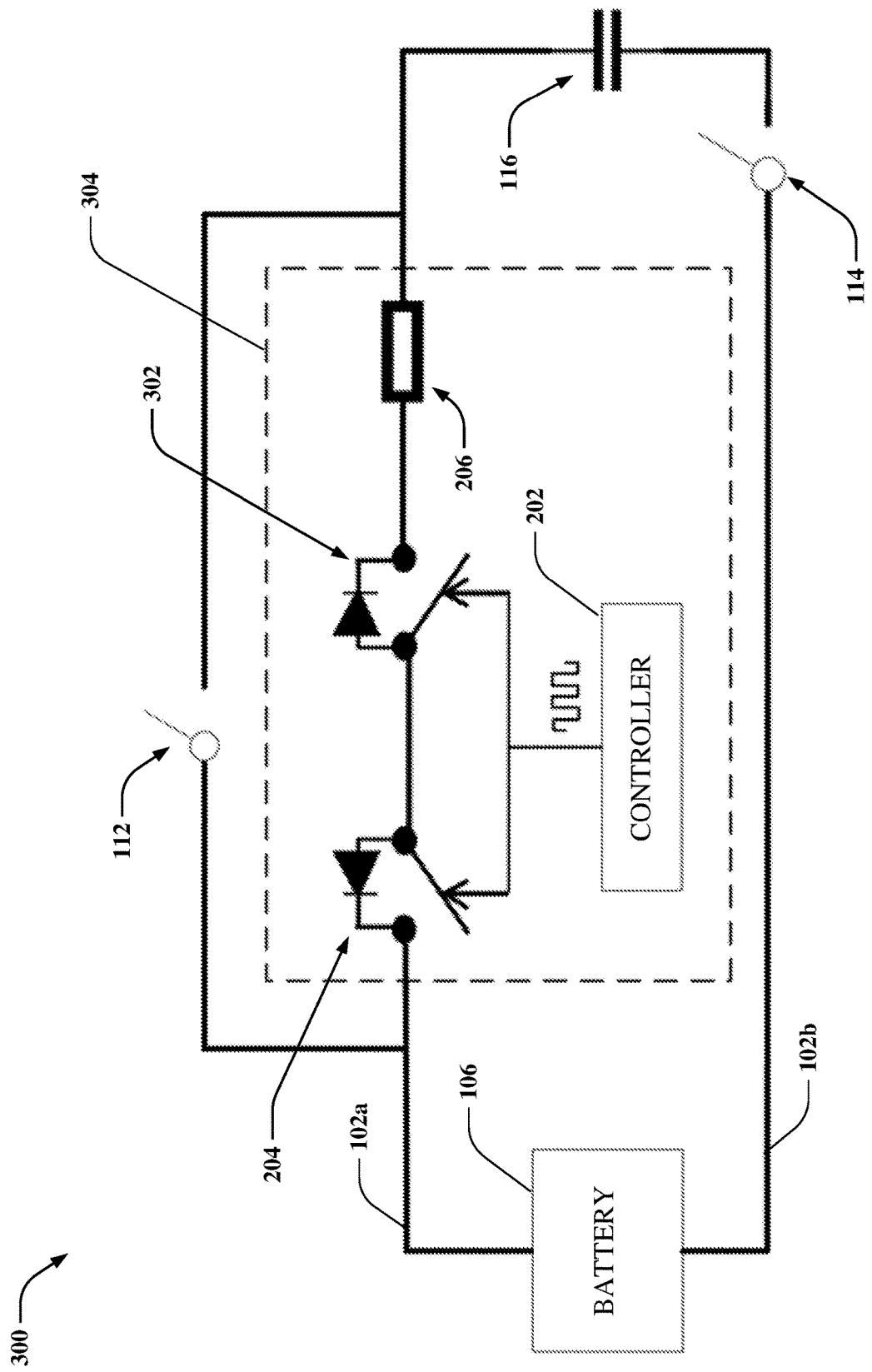
FIG. 3 illustrates a block diagram of an example, non-limiting pre-charging circuit in accordance with one or more embodiments described herein.

The foregoing can be remedied by implementing a second MOSFET (e.g., switch 302) with a respective body diode oriented in a direction opposite the body diode of the switch 204 (see, e.g., FIG. 3). In this regard, FIG. 3 illustrates a block diagram of an example, non-limiting pre-charging circuit 300 (e.g., a pre-charging architecture) in accordance with one or more embodiments described herein. In various embodiments, the pre-charging circuit 300 can comprise a battery 106, load 116, contactor 112, contactor 114, and controller 202, switch 204, resistor 206, and/or pre-charge module 304. In one or more embodiments, pre-charge module 304 can comprise switch 204, switch 302, resistor 206, and/or controller 202. In various embodiments, the pre-charge module 304 can be similar to the pre-charge module 118. In FIG. 3, LV DC-DC converter 108 and OBC 110 are omitted for purposes of illustration, though it is noted that the pre-charge module 304 can similarly comprise the LV DC-DC converter 108 and OBC 110. It is additionally noted the pre-charge circuit 104 can comprise one or more components of the pre-charge module 304.

In this regard, the two MOSFETs (e.g., switch 204 and switch 302) can be located back-to-back (e.g., adjacently located and/or connected by wire), with respective body diodes oriented in opposing directions. In various embodiments, switch 204 and switch 302 can be driven by the same control signal from controller 202, or by separate control signals from controller 202. While it is noted that adding a MOSFET can increase thermal dissipation, such thermal dissipation can be remedied by the utilization of a pulse width modulation (PWM) signal (e.g., at 1 kHz or another suitable frequency). Using PWM can enable pre-charge to occur without heating up the MOSFETs as quickly (e.g., as compared to full-on). In this regard, the controller 202 can generate a PWM signal for rapidly opening or closing the switch 204 and/or switch 302. According to an embodiment, the controller 202 can cause switch 204 and switch 302 to open once load 116 is charged to the same voltage as (or within a defined threshold voltage of) voltage of the battery 106. One or more embodiments can utilize a pulse pattern (e.g., switch 204 and switch 302 opened and closed with sharp internal, such as defined intervals of milliseconds). With such a pulse pattern, average power loss and temperature rise in switch 204 and switch 302 can be mitigated. Once voltage of load 116 is equal to voltage of battery 106, or within a threshold of voltage of battery 106 (e.g., 90% or 95%), contactor 112 (e.g., a mechanical contactor) can be closed, and switch 204 and switch 302 can be opened, for example, during normal operation of the vehicle (e.g., during driving or charging).

According to an implementation, the load 116 can comprise a capacitor. In this regard, the capacitor can be slowly charged (e.g., 1-2 seconds, though other suitable charge times can be utilized) by limiting current flowing from the battery 106 into the contactors (e.g., contactor 112 and/or contactor 114). In this regard, the load 116 (e.g., a capacitor) can be pre-charged (e.g., until 90% or 95% charged), then the main contactors (e.g., contactor 112 and/or contactor 114) can be closed. In further embodiments, load 116 can comprise a traction inverter or an OBC capacitor. For example, before initiating a driving operation of a corresponding EV, the controller 202 can pre-charge a traction inverter for driving. Similarly, before initiating a charging operation of a battery 106, the controller 202 can pre-charge an OBC capacitor of a corresponding EV.

Figure 4:
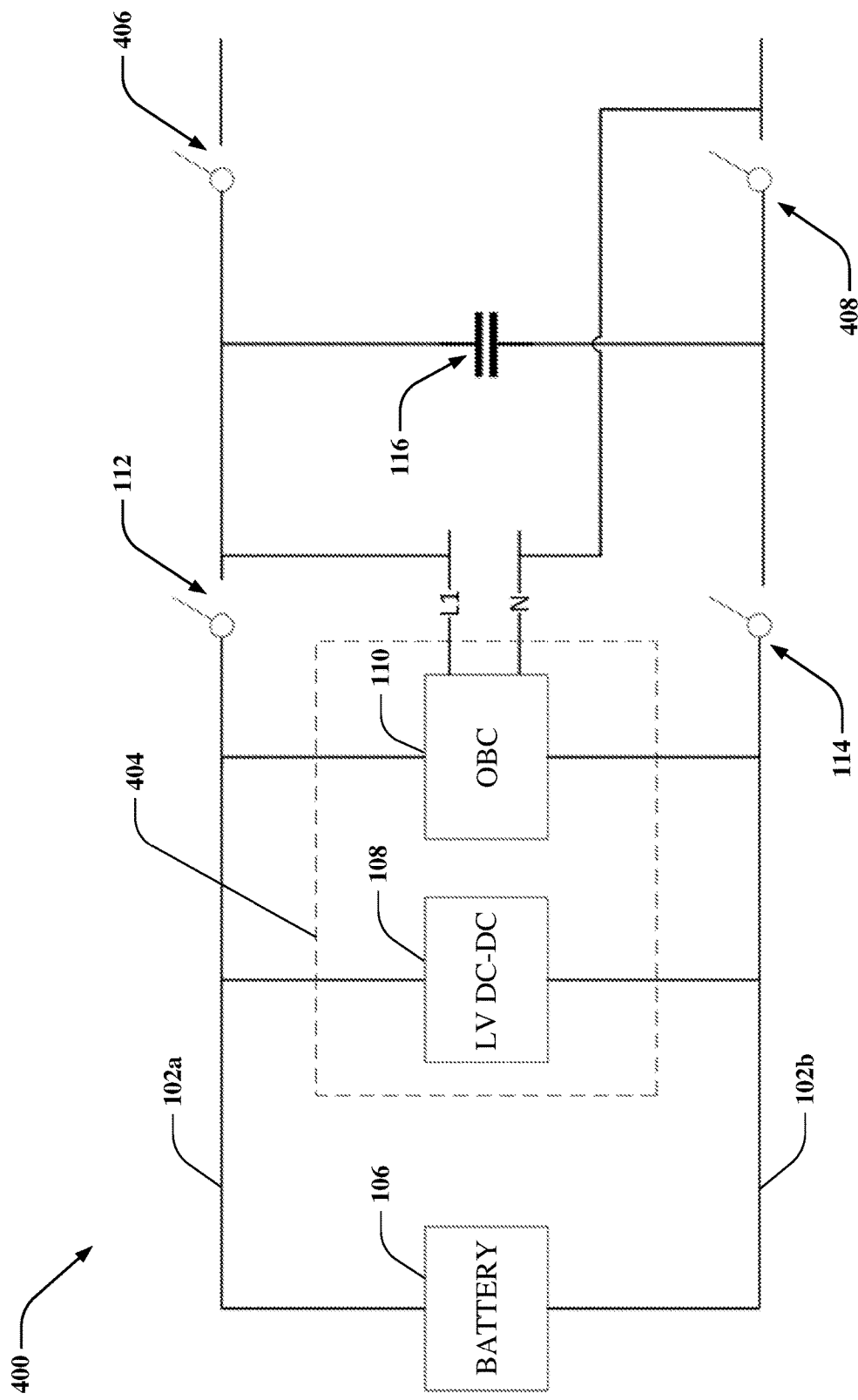
FIG. 4 illustrates a block diagram of an example, non-limiting pre-charging circuit in accordance with one or more embodiments described herein.

Turning now to FIG. 4, a block diagram of an example, non-limiting pre-charging circuit 400 (e.g., a pre-charging architecture) in accordance with one or more embodiments described herein is depicted. In various embodiments, the pre-charging circuit 400 can comprise a HV DC bus 102 (e.g., positive bus 102a and negative bus 102b), battery 106 (e.g., an HV battery, such as an 800 volt battery, 600 volt battery, 400 volt battery, or another suitable battery), contactor 112 (e.g., a first contactor), contactor 114 (e.g., a second contactor), load 116, contactor 406 (e.g., a positive fast charging contactor), contactor 408 (e.g., a negative fast charging contactor), and/or pre-charge module 404. In one or more embodiments, the pre-charge module 404 can comprise LV DC-DC converter 108, and/or OBC 110.

In pre-charging circuit 400, LV DC-DC converter 108 and OBC 110 can both be connected to the HV DC bus 102 before the main contactors (e.g., contactor 112 and contactor 114) (e.g., on a battery-side of the contactor 112 and contactor 114). In one or more embodiments, OBC AC lines L1 (e.g., a phase wire) and neutral wire (N) can be connected to the HV DC bus 102. Though L1 depicts only one input phase, other suitable input phases can be incorporated (e.g., depending on market), such as three-phase AC power. In one or more embodiments, L1 and N can be connected to the HV DC bus 102 after the contactor 112 and the contactor 408 (e.g., a negative fast charging contactor). In this regard, L1 can connect the OBC 110 to the positive bus on a load-side of the positive bus, and N can connect the on-board charger to the negative bus on a load-side of the negative bus. According to an embodiment, L1 can connect the OBC 110 to positive bus 102a on a load-side of the positive bus 102a and N can connect the OBC 110 to negative bus 102b on a load-side of the negative bus 102b. In further embodiments, N can connect the OBC 110 to positive bus 102a on a load-side of the positive bus 102a and L1 can connect the OBC 110 to negative bus 102b on a load-side of the negative bus 102b. In an embodiment, the OBC 110 (e.g., a bidirectional OBC) can be capable of AC power output and/or DC power output. In this regard, OBC 110 can comprise a DC-DC converter and an inverter. In various embodiments, the DC power output can be utilized for a pre-charge operation herein.

Figure 5:
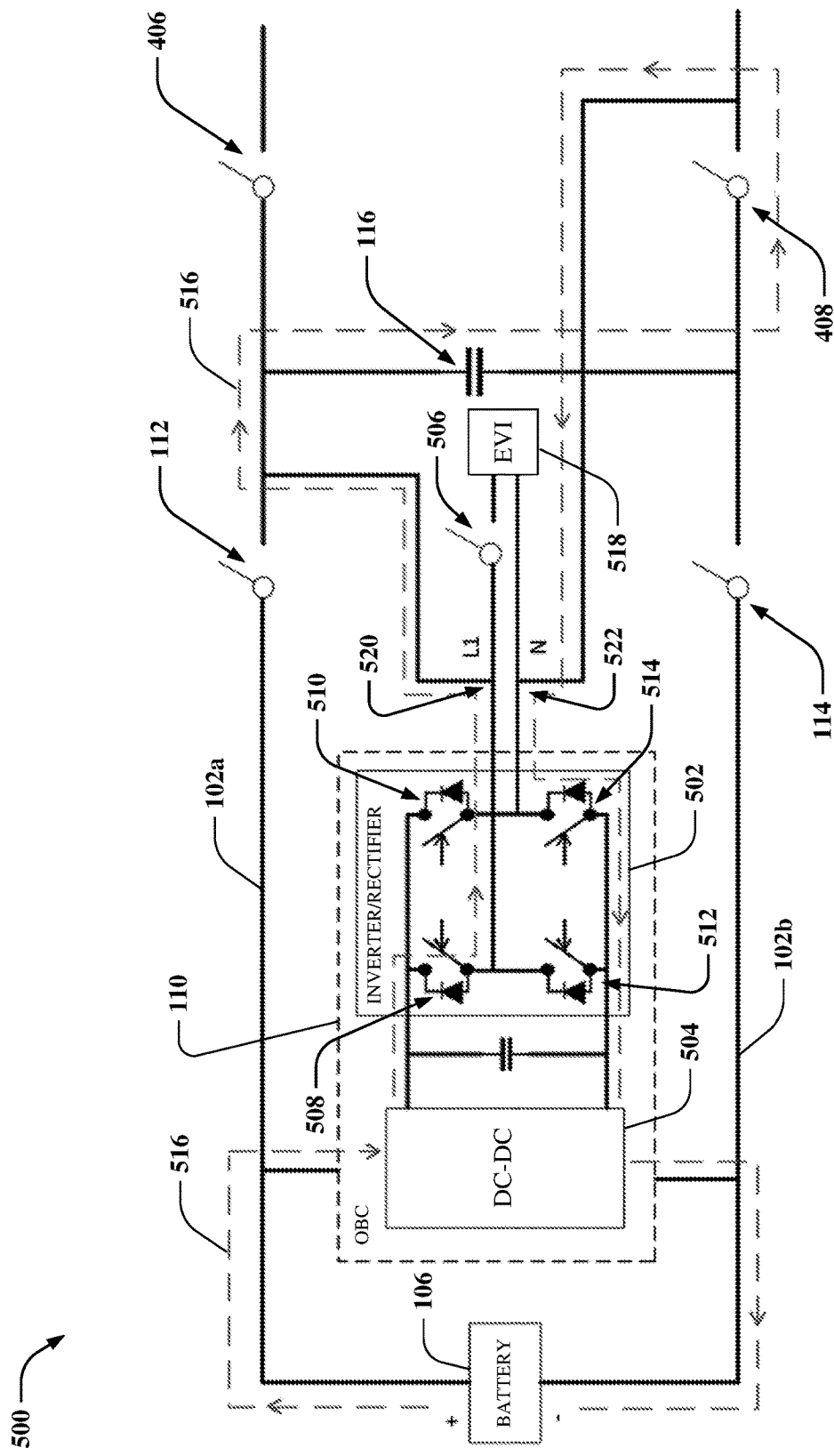
FIG. 5 illustrates a block diagram of an example, non-limiting pre-charging circuit in accordance with one or more embodiments described herein.
Figure 6:
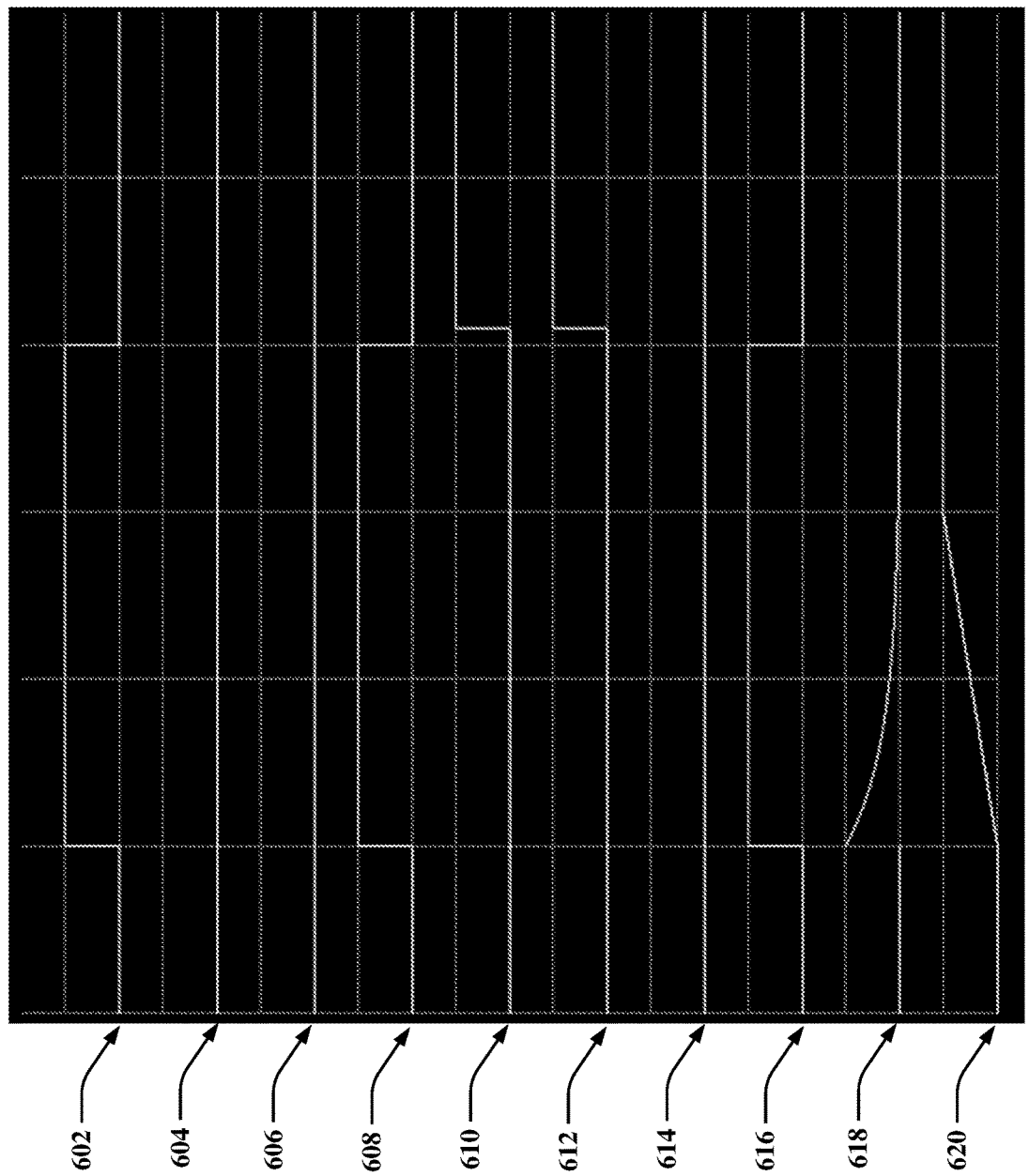
FIG. 6 illustrates an example, non-limiting timing diagram in accordance with one or more embodiments described herein.

FIG. 5 illustrates a block diagram of an example, non-limiting pre-charging circuit 500 (e.g., a pre-charging architecture) in accordance with one or more embodiments described herein. In various embodiments, the pre-charging circuit 500 can comprise a HV DC bus 102 (e.g., positive bus 102a and negative bus 102b), battery 106 (e.g., an HV battery, such as an 800 volt battery, 600 volt battery, 400 volt battery, or another suitable battery), contactor 112 (e.g., a first contactor), contactor 114 (e.g., a second contactor), load 116, contactor 406, contactor 408, OBC 110, electric vehicle inlet (EVI) 518, contactor 506. In one or more embodiments, OBC 110 can comprise subcomponents (e.g., a DC-DC converter 504, an inverter/rectifier 502, and/or other suitable subcomponents). In an embodiment, the DC-DC converter 504 can be similar to the LV DC-DC converter 108, and can be configured to output a defined and/or controlled (e.g., by controller 202) pre-charge voltage and current. For the power to flow through an inverter stage, switch 508 and switch 514 can be closed, while switch 510 and switch 512 can remain open. To complete the pre-charge circuit, contactor 408 (e.g., a negative fast charging contactor) can be closed, thus allowing current to flow through the load 116 (e.g., DC link capacitors) represented by the power flow path 516. Once the pre-charge is complete, the OBC 110 can stop outputting power, switch 508, switch 514, and contactor 408 can be opened, and contactor 112 and contactor 114 can be closed. An exemplary timing diagram 600 for this sequence is depicted in FIG. 6. In this regard, line 602 can correspond to the opened or closed status of switch 508, line 604 can correspond to the opened or closed status of switch 510, line 606 can correspond to the opened or closed status of switch 512, line 608 can correspond to the opened or closed status of switch 514, line 610 can correspond to the opened or closed status of contactor 112, line 612 can correspond to the opened or closed status of contactor 114, line 614 can correspond to the opened or closed status of contactor 408, line 618 can correspond to the current across load 116, and line 620 can correspond to the voltage across load 116.

According to an embodiment, connection points of L1 and N (e.g., after the contactor 112 and the contactor 408, respectively) (e.g., on a load-side) can be utilized for safety precautions (e.g., to avoid electric shock or electrocution via EVI 518). According to an example, if both connection points (e.g., connection point 520 and connection point 522)

are placed after (e.g., on a battery-side of) the main contactors (e.g., contactor 112 and contactor 114) and before (e.g., on a battery-side of) the fast-charging contactors (e.g., contactor 406 and contactor 408), the EVI 518 can be energized when a corresponding EV is in an active mode (e.g., presenting an electric shock or electrocution concern via the EVI 518—only during a pre-charge). Therefore, contactor 506 (and/or a relay) can be located between the OBC 110 and EVI 518 on L1, which can be opened during a pre-charging operation to disconnect the EVI 518 from L1 or another AC phase. Next, in response to the pre-charging operation being determined to be completed (e.g., by the controller 202), the controller 202 can close contactor 506. In one or more embodiments, by placing the OBC 110 and battery 106 before (e.g., on a battery side of) the main contactors (e.g., contactor 112 and contactor 114), the OBC 110 can access the battery, for instance, prior to closing of the main contactors (e.g., contactor 112 and contactor 114). Therefore, the OBC 110 can regulate current and voltage accurately (e.g., via the DC-DC converter 504). According to an embodiment, the inverter/rectifier 502 (e.g., the OBC 110) can enable an H bridge operation (e.g., repeatedly corresponding switches on and off). It is noted that the inverter/rectifier 502 of the OBC 110 can be representative of inverter and rectifier functionality (e.g., OBC 110 can perform bidirectional conversion between alternating current and direct current). According to an embodiment, if switch 508 and switch 514 (e.g., a first pair of MOSFETs) are closed, and switch 510 and switch 512 (e.g., a second pair of MOSFETs) are opened, power can steadily flow along power flow path 516. In various embodiments, OBC 110 can comprise one or more input phases, depending on intended market. For example, OBC can comprise three input phases, one input phase, or other suitable input phases. In various embodiments, L1 can be connected after contactor 112 (e.g., on a load-side of the contactor 112). Neutral phase (N) can be connected on a return path to the battery 106 after the contactor 408. By regulating the current and voltage in the DC-DC converter 504 and closing one or more switches or contactors herein, power flow path 516 can be realized, in which power can flow to the load 116 for pre-charging.

Systems, circuits, controllers, and/or modules herein can comprise a memory which can store one or more computer/machine readable and/or executable components and/or instructions that, when executed by a processor (e.g., a classical processor, a quantum processor, etc.), can facilitate performance of operations defined by the executable component(s) and/or instruction(s). The memory can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures.

Systems, circuits, controllers, and/or modules herein can comprise a processor which can comprise one or more types of processors and/or electronic circuitry (e.g., a classical processor, graphics processor, a quantum processor, etc.) that can implement one or more computer and/or machine readable, writable, and/or executable components and/or instructions that can be stored on a memory. For example, the processor can perform various operations that can be specified by such computer and/or machine readable, writable, and/or executable components and/or instructions including, but not limited to, logic, control, input/output (I/O), arithmetic, and/or the like. In some embodiments, processors herein can comprise one or more central processing unit, multi-core processor, microprocessor, dual microprocessors, microcontroller, System on a Chip (SOC), array processor, vector processor, quantum processor, and/or another type of processor.

Figure 7:
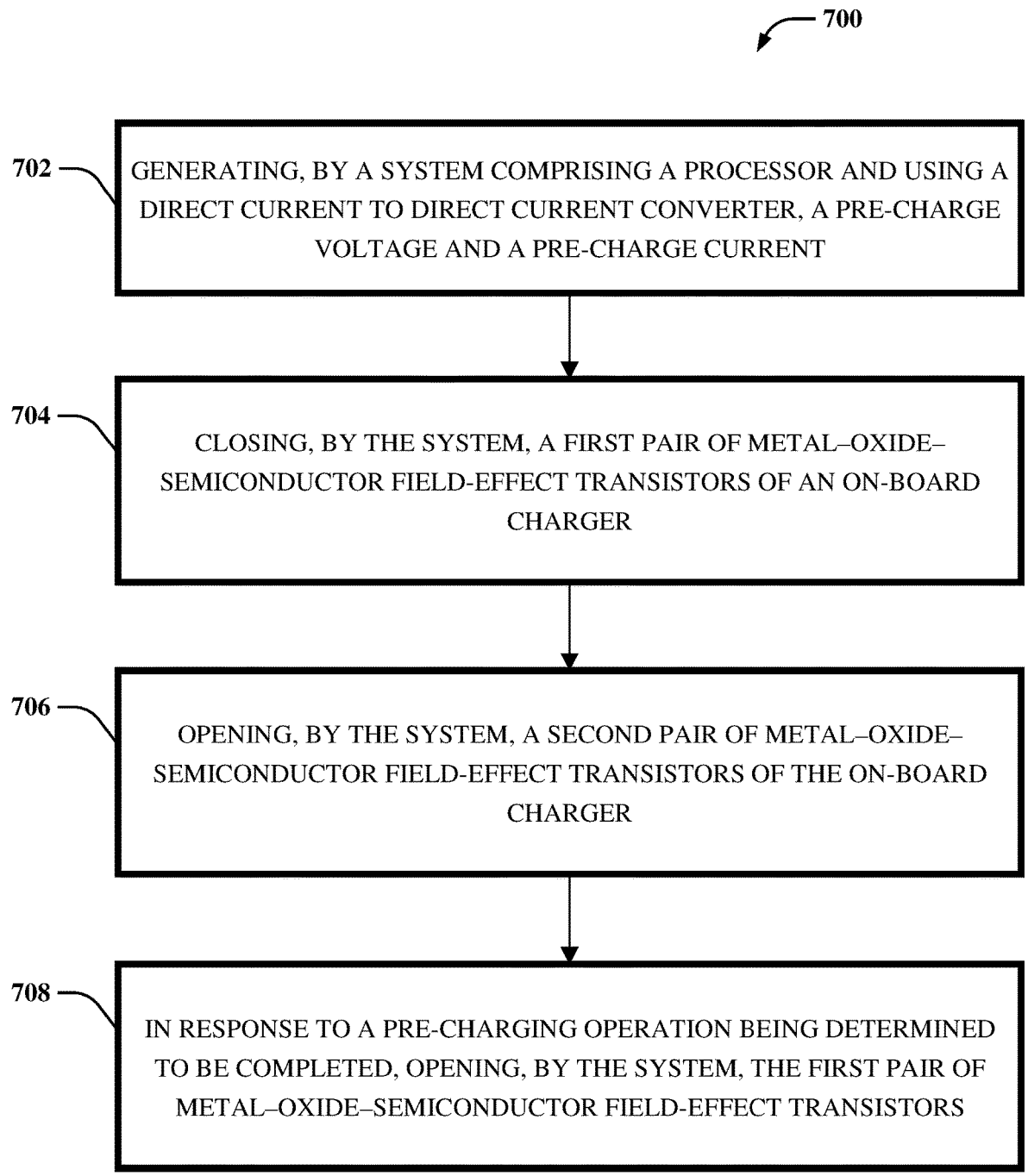
FIG. 7 illustrates a flow diagram of an example, non-limiting pre-charging process in accordance with one or more embodiments described herein.

FIG. 7 illustrates a flow diagram of an example, non-limiting pre-charging process 700 in accordance with one or more embodiments described herein. Repetitive description of like elements and/or processes employed in respective embodiments is omitted for sake of brevity. At 702, process 700 can comprise generating, by a system (e.g., via controller 202) comprising a processor and using a direct current to direct current converter (e.g., LV DC-DC converter 108), a pre-charge voltage and a pre-charge current. At 704, process 700 can comprise closing, by the system (e.g., via controller 202), a first pair of metal-oxide-semiconductor field-effect transistors (e.g., switch 508 and switch 514) of an on-board charger (e.g., OBC 110). At 706, process 700 can comprise opening, by the system (e.g., via controller 202), a second pair of metal-oxide-semiconductor field-effect transistors (e.g., switch 510 and switch 512) of the on-board charger (e.g., OBC 110). At 708, process 700 can comprise in response to a pre-charging operation being determined to be completed, opening, by the system (e.g., via controller 202), the first pair of metal-oxide-semiconductor field-effect transistors (e.g., switch 508 and switch 514).

Systems described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, systems herein (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, systems herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, a system herein can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, systems herein can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

Systems herein can comprise one or more computer and/or machine readable, writable, and/or executable components and/or instructions that, when executed by processor (e.g., a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). For example, any component associated with systems as disclosed herein (e.g., communicatively, electronically, operatively, and/or optically coupled with and/or employed by a system described herein), can comprise such computer and/or machine readable, writable, and/or executable component(s) and/or instruction(s). Consequently, according to numerous embodiments or systems herein and/or any components associated therewith as disclosed herein, can employ a processor to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system herein can comprise a computing device, a general-purpose computer, a special-purpose computer, an on-board computing device, a communication device, an on-board communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 8:
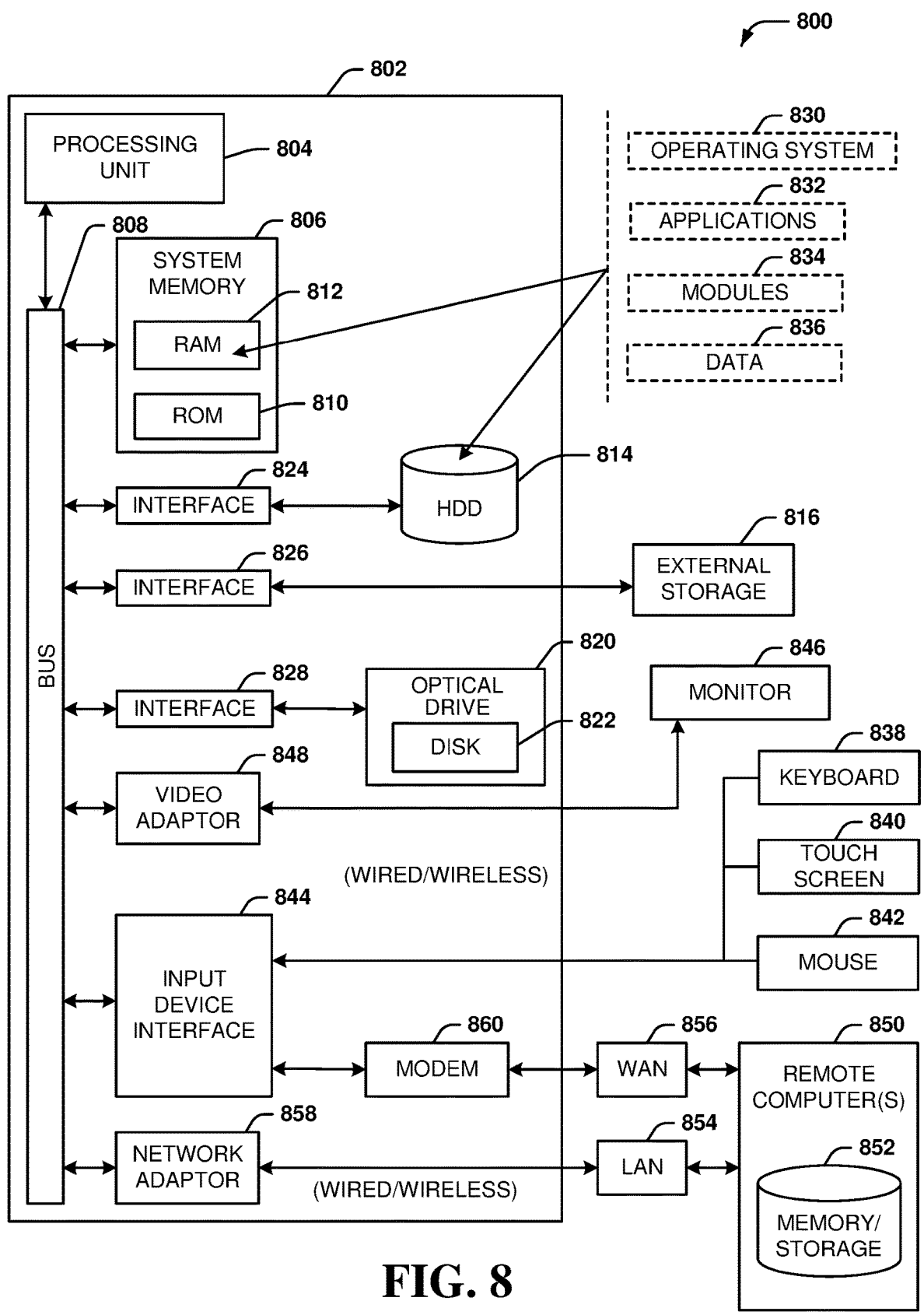
FIG. 8 is an example, non-limiting computing environment in which one or more embodiments described herein can be implemented.

In order to provide additional context for various embodiments described herein, FIG. 8 and the following discussion are intended to provide a brief, general description of a suitable computing environment 800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and an optical disk drive 820 (e.g., which can read or write from a CD-ROM disc, a DVD, a BD, etc.). While the internal HDD 814 is illustrated as located within the computer 802, the internal HDD 814 can also be configured for external use in a suitable chassis (not shown). Additionally, while not shown in environment 800, a solid-state drive (SSD) could be used in addition to, or in place of, an HDD 814. The HDD 814, external storage device(s) 816 and optical disk drive 820 can be connected to the system bus 808 by an HDD interface 824, an external storage interface 826 and an optical drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can be enable with a security module, such as a trusted processing module (TPM). For instance, with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 846 or other type of display device can be also connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the Internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link between the computers can be used.

When used in either a LAN or WAN networking environment, the computer 802 can access cloud storage systems or other network-based storage systems in addition to, or in place of, external storage devices 816 as described above. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 9:
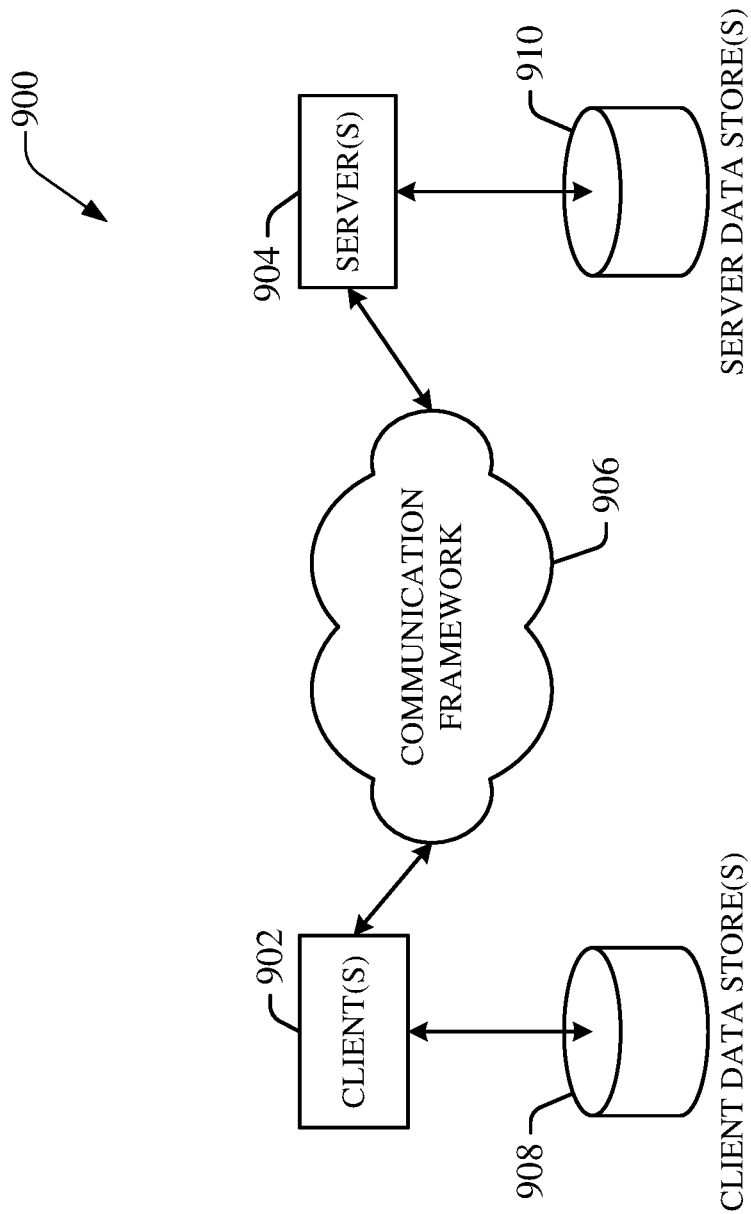
FIG. 9 is an example, non-limiting networking environment in which one or more embodiments described herein can be implemented.

Referring now to FIG. 9, there is illustrated a schematic block diagram of a computing environment 900 in accordance with this specification. The system 900 includes one or more client(s) 902, (e.g., computers, smart phones, tablets, cameras, PDA's). The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware or hardware in combination with software (e.g., threads, processes, computing devices). The servers 904 can house threads to perform transformations of media items by employing aspects of this disclosure, for example. One possible communication between a client 902 and a server 904 can be in the form of a data packet adapted to be transmitted between two or more computer processes wherein data packets can include coded analyzed headspaces and/or input. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In one exemplary implementation, a client 902 can transfer an encoded file, (e.g., encoded media item), to server 904. Server 904 can store the file, decode the file, or transmit the file to another client 902. It is to be appreciated, that a client 902 can also transfer uncompressed file to a server 904 and server 904 can compress the file and/or transform the file in accordance with this disclosure. Likewise, server 904 can encode information and transmit the information via communication framework 906 to one or more clients 902.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. An electric vehicle pre-charging circuit, comprising:
   a first contactor located on a positive bus between a load and a battery;
   a second contactor located on a negative bus between the load and the battery; and
   an on-board charger connected to the positive bus and the negative bus on a battery-side of the positive bus and a battery-side of the negative bus, wherein a phase wire connects the on-board charger to the positive bus on a load-side of the positive bus, and wherein a neutral wire connects the on-board charger to the negative bus on a load-side of the negative bus.

2. The electric vehicle pre-charging circuit of any preceding clause, further comprising:
   a switch located on the phase wire between the on-board charger and an electric vehicle inlet.

3. The electric vehicle pre-charging circuit of any preceding clause, wherein the on-board charger performs bidirectional conversion between alternating current and direct current.

4. The electric vehicle pre-charging circuit of any preceding clause, wherein the on-board charger comprises one or more metal-oxide-semiconductor field-effect transistors.

5. The electric vehicle pre-charging circuit of any preceding clause, wherein the load comprises a capacitor.

6. The electric vehicle pre-charging circuit of any preceding clause, wherein the load comprises a traction inverter.

7. The electric vehicle pre-charging circuit of any preceding clause, wherein the battery comprises an 800 volt battery.

8. The electric vehicle pre-charging circuit of any preceding clause, wherein the battery comprises a 400 volt battery.

9. The electric vehicle pre-charging circuit of clause 1 above with any set of combinations of electric vehicle pre-charging circuits 2-8 above.

10. An electric vehicle pre-charging circuit, comprising:
    a first contactor located on a positive bus between a load and a battery;
    a second contactor located on a negative bus between the load and the battery;
    an on-board charger connected to the positive bus and the negative bus on a load-side of the positive bus and a load-side of the negative bus; and
    a metal-oxide-semiconductor field-effect transistor (MOSFET) switch connected to the positive bus on a battery-side of the first contactor and to the on-board charger.

11. The electric vehicle pre-charging circuit of any preceding clause, wherein the MOSFET switch comprises a first MOSFET switch, and wherein the electric vehicle pre-charging circuit further comprise:
    a second MOSFET switch located between the first MOSFET switch and the on-board charger.

12. The electric vehicle pre-charging circuit of any preceding clause, wherein a body diode of the first MOSFET switch and a body diode of the second MOSFET switch oppose directions.

13. The electric vehicle pre-charging circuit of any preceding clause, further comprising:
    a direct current to direct current converter connected the positive bus on the battery-side of the first contactor and to the negative bus on the battery-side of the second contactor.

14. The electric vehicle pre-charging circuit of any preceding clause, wherein the load comprises a capacitor.

15. The electric vehicle pre-charging circuit of any preceding clause, wherein the load comprises a traction inverter.

16. The electric vehicle pre-charging circuit of any preceding clause, further comprising a controller comprising a memory and a processor, wherein the controller opens or closes the MOSFET switch until a voltage of the battery and a voltage of the load are equal.

17. The electric vehicle pre-charging circuit of any preceding clause, wherein the controller sends a pulse-width-modulation signal to the MOSFET switch to open or close the MOSFET switch.

18. The electric vehicle pre-charging circuit of clause 10 above with any set of combinations of electric vehicle pre-charging circuits 11-17 above.

19. A method, comprising:
    generating, by a system comprising a processor and using a direct current to direct current converter, a pre-charge voltage and a pre-charge current;
    closing, by the system, a first pair of metal-oxide-semiconductor field-effect transistors of an on-board charger;
    opening, by the system, a second pair of metal-oxide-semiconductor field-effect transistors of the on-board charger; and
    in response to a pre-charging operation being determined to be completed, opening, by the system, the first pair of metal-oxide-semiconductor field-effect transistors.

20. The method of any preceding clause, further comprising:
in response to opening the first pair of metal-oxide-semiconductor field-effect transistors, closing, by the system, a negative fast charging contactor.

21. The method of any preceding clause, further comprising:
during the pre-charging operation, opening, by the system, a contactor located on a phase wire between the on-board charger and an electric vehicle inlet.

22. The method of any preceding clause, further comprising:
in response to the pre-charging operation being determined to be completed, closing, by the system, the contactor located on the phase wire between the on-board charger and the electric vehicle inlet.

23. The method of clause 19 above with any set of combinations of methods 20-22 above.

What is claimed is:

1. An electric vehicle pre-charging circuit, comprising:
a first contactor located on a positive bus between a load and a battery;
a second contactor located on a negative bus between the load and the battery; and
a pre-charge module integrated into the electric vehicle pre-charging circuit between the load and the battery, wherein the pre-charge module comprises a low voltage direct current to direct current converter, an on-board charger, and a resistor,
wherein the low voltage direct current to direct current converter is connected to the positive bus and the negative bus on a battery-side of the positive bus and a battery-side of the negative bus,
wherein the on-board charger is connected to the positive bus and the negative bus on the battery-side of the positive bus and the battery-side of the negative bus, wherein a phase wire connects the on-board charger to the positive bus on a load-side of the positive bus, and wherein a neutral wire connects the on-board charger to the negative bus on a load-side of the negative bus, and
wherein the resistor is connected between the load and the battery.

2. The electric vehicle pre-charging circuit of claim 1, further comprising:
a switch located on the phase wire between the on-board charger and an electric vehicle inlet.

3. The electric vehicle pre-charging circuit of claim 1, wherein the on-board charger performs bidirectional conversion between alternating current and direct current.

4. The electric vehicle pre-charging circuit of claim 3, wherein the on-board charger comprises one or more metal-oxide-semiconductor field-effect transistors.

5. The electric vehicle pre-charging circuit of claim 1, wherein the load comprises a capacitor.

6. The electric vehicle pre-charging circuit of claim 1, wherein the load comprises a traction inverter.

7. The electric vehicle pre-charging circuit of claim 1, wherein the battery comprises an 800 volt battery.

8. The electric vehicle pre-charging circuit of claim 1, wherein the battery comprises a 400 volt battery.

9. The electric vehicle pre-charging circuit of claim 1, further comprising:
a metal-oxide-semiconductor field-effect transistor (MOSFET) switch connected to the positive bus on a battery-side of the first contactor and to the on-board charger.

10. The electric vehicle pre-charging circuit of claim 9, wherein the MOSFET switch comprises a first MOSFET switch, and wherein the electric vehicle pre-charging circuit further comprises:
a second MOSFET switch located between the first MOSFET switch and the on-board charger.

11. The electric vehicle pre-charging circuit of claim 10, wherein a body diode of the first MOSFET switch and a body diode of the second MOSFET switch oppose directions.

12. A method, comprising:
generating, by a system comprising a processor and using a direct current to direct current converter, a pre-charge voltage and a pre-charge current;
closing, by the system, a first pair of metal-oxide-semiconductor field-effect transistors of an on-board charger;
opening, by the system, a second pair of metal-oxide-semiconductor field-effect transistors of the on-board charger; and
in response to a pre-charging operation being determined to be completed, opening, by the system, the first pair of metal-oxide-semiconductor field-effect transistors.

13. The method of claim 12, further comprising:
in response to opening the first pair of metal-oxide-semiconductor field-effect transistors, closing, by the system, a negative fast charging contactor.

14. The method of claim 12, further comprising:
during the pre-charging operation, opening, by the system, a contactor located on a phase wire between the on-board charger and an electric vehicle inlet.

15. The method of claim 14, further comprising:
in response to the pre-charging operation being determined to be completed, closing, by the system, the contactor located on the phase wire between the on-board charger and the electric vehicle inlet.

16. A system, comprising:
a memory that stores computer executable programs; and
a processor that executes at least one of the computer executable programs to:
generate, using a direct current to direct current converter, a pre-charge voltage and a pre-charge current;
close a first pair of metal-oxide-semiconductor field-effect transistors of an on-board charger;
open a second pair of metal-oxide-semiconductor field-effect transistors of the on-board charger; and
in response to a pre-charging operation being determined to be completed, open the first pair of metal-oxide-semiconductor field-effect transistors.

17. The system of claim 16, wherein the at least one of the computer executable programs further:
in response to opening the first pair of metal-oxide-semiconductor field-effect transistors, close a negative fast charging contactor.

18. The system of claim 16, wherein the at least one of the computer executable programs further:
during the pre-charging operation, open a contactor located on a phase wire between the on-board charger and an electric vehicle inlet.

19. The system of claim 18, wherein the at least one of the computer executable programs further:
in response to the pre-charging operation being determined to be completed, close the contactor located on the phase wire between the on-board charger and the electric vehicle inlet.

20. The system of claim 16, wherein the onboard charger performs bidirectional conversion between alternating current and direct current.

\* \* \* \* \*